United States Patent
Mashima et al.

(10) Patent No.: US 9,458,057 B2
(45) Date of Patent: Oct. 4, 2016

(54) REED SWITCH GLASS TUBE

(75) Inventors: Ryota Mashima, Otsu (JP); Masahiro Kobayashi, Otsu (JP); Ken Kashiwadani, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 467 days.

(21) Appl. No.: 13/979,391

(22) PCT Filed: Nov. 30, 2011

(86) PCT No.: PCT/JP2011/077712
§ 371 (c)(1),
(2), (4) Date: Jul. 12, 2013

(87) PCT Pub. No.: WO2012/096064
PCT Pub. Date: Jul. 19, 2012

(65) Prior Publication Data
US 2013/0287977 A1    Oct. 31, 2013

(30) Foreign Application Priority Data
Jan. 14, 2011   (JP) ................... 2011-006264

(51) Int. Cl.
C03C 23/00 (2006.01)
C03B 27/06 (2006.01)
H01H 36/00 (2006.01)
H01H 51/28 (2006.01)

(52) U.S. Cl.
CPC ........... *C03C 23/0025* (2013.01); *C03B 27/06* (2013.01); *C03B 27/065* (2013.01); *H01H 36/0033* (2013.01); *H01H 51/281* (2013.01); *Y10T 428/131* (2015.01)

(58) Field of Classification Search
CPC . C03B 27/06; C03B 27/065; C03C 23/0025; C03C 3/087; H01H 36/0033; H01H 51/281; Y10T 428/131
USPC ................ 428/34.4, 36.9, 36.91, 36.92, 35.7
See application file for complete search history.

(56) References Cited

U.S. PATENT DOCUMENTS 3,687,799 A * 8/1972 Spanoudis ............ C03C 4/0071
                                                    252/301.4 R
6,727,198 B1 * 4/2004 Hashimoto ............ C03C 3/085
                                                    501/66
2006/0141181 A1   6/2006 Langsdorf et al.

FOREIGN PATENT DOCUMENTS

| JP | 10-111497 A | 4/1998 |
| JP | 2000-344551 A | 12/2000 |
| JP | 2001-084864 A | 3/2001 |
| JP | 2006-169102 A | 6/2006 |

OTHER PUBLICATIONS

International Search Report of the corresponding International Application No. PCT/JP2011077712, dated Mar. 13, 2012.

* cited by examiner

*Primary Examiner* — Yan Lan
(74) *Attorney, Agent, or Firm* — Global IP Counselors, LLP

(57) ABSTRACT

A reed switch glass tube is capable of preventing, for example, chipping and cracking of end parts thereof by forming a compressive stress layer having a length (A) from an end face within a range of 0.1 mm to 0.6 mm on an outer circumference surface of the end part of the glass tube.

14 Claims, 3 Drawing Sheets

1mm

PRIOR ART

REED SWITCH GLASS TUBE

CROSS-REFERENCE TO RELATED APPLICATIONS

This U.S. National stage application claims priority under 35 U.S.C. §119(a) to Japanese Patent Application No. 2011-006264, filed in Japan on Jan. 14, 2011, the entire contents of Japanese Patent Application No. 2011-006264 being hereby incorporated herein by reference.

BACKGROUND

1. Field of the invention

The present invention relates to a reed switch glass tube.

2. Description of Related Art

A reed switch comprises a contact point composed of opposed magnetic wire rods, and a glass tube for encapsulating the magnetic wire rods, which opens and closes the contact point by providing a magnetic field from the outside of the glass tube. Encapsulation of the magnetic wire rods into the glass tube is performed by inserting the magnetic wire rods into the glass tube under inert gas, reducing gas or under vacuum and softening by heating both end parts of the glass tube to be sealed.

When end parts of the reed switch glass tube have sharp corners and fine cracks, there are problems that the end parts of the glass tube are chipped and cracked typically during transport and shards thereof are mixed into the glass tube at the time of an encapsulation process. Therefore, glazing treatment to carry out rounding processing by heating the end parts of the glass tube with a burner to be softened has been conventionally performed.

However, in recent years, as an electron device has been downsized and light-weighted, a reed switch glass tube has been more and more decreased in diameter, thickness, and length. Typically, a minute reed switch glass tube having an outer diameter of 1.3 mm, a thickness of 0.2 mm, and a length of 3.1 mm had a problem that it was not possible to prevent, for example, chipping and cracking of end parts of the glass tube at the time of rounding processing by burner heating.

Until now, a technique for rounding end parts of the glass plate by the irradiation of laser light to a side of the glass plate is known (for example, Japanese Unexamined Patent Application Publication Nos. JP 2000-344551 A and JP 10-111497 A). This technique is, however, to round the glass plate by moving laser beams along the side of the glass tube. Therefore, when this technique was adopted to a minute reed switch glass tube, irregularity caused by a beam trajectory occurs on end faces of the glass tube. As a result, irregularity involves at the time of the encapsulation process, which causes generation of bubbles.

SUMMARY

The present invention has made in view of the aforementioned problem with the conventional reed switch glass tube. It is an object of the present invention to provide a reed switch glass tube capable of reliably preventing, for example, chipping and cracking of end parts thereof typically during transport.

In a first preferred aspect, there is provided a reed switch glass tube in which a compressive stress layer is formed at an end part thereof according to the present invention, the compressive stress layer formed on an outer circumference surface of the glass tube in the end part has a length of 0.1 mm to 0.6 mm in a longitudinal direction.

In a second preferred aspect of the reed switch glass tube according to the present invention, stress in a compressive stress layer formed on an end face of the glass tube in the end part is greater than stress in the compressive stress layer formed on the outer circumference surface.

In a third preferred aspect of the reed switch glass tube according to the present invention, an infrared transmittance of glass of the reed switch glass tube at a wavelength of 1,050 nm is 10% or lower for a thickness of the glass of 0.5 mm.

According to the reed switch glass tube of the present invention, a compressive stress layer having a length from an end face within the range of 0.1 mm to 0.6 mm is formed on an outer circumference surface of an end part of the glass tube. Accordingly, it is possible to reliably prevent the end parts of the glass tube from chipping and cracking or the like, even when contacting the outside typically during transport.

DESCRIPTION OF THE PREFERRED EMBODIMENTS

Figure 1:
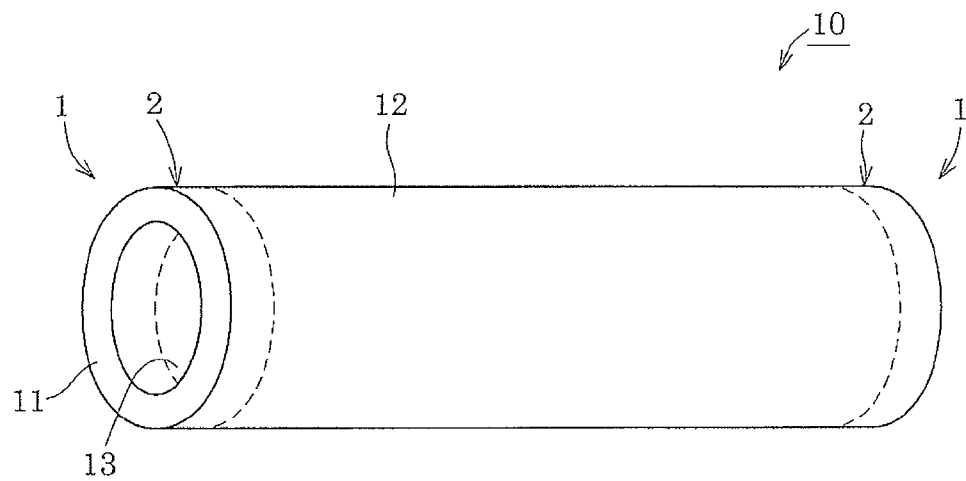
FIG. 1 is a perspective view of a reed switch glass tube in an embodiment of the present invention.
Figure 2:
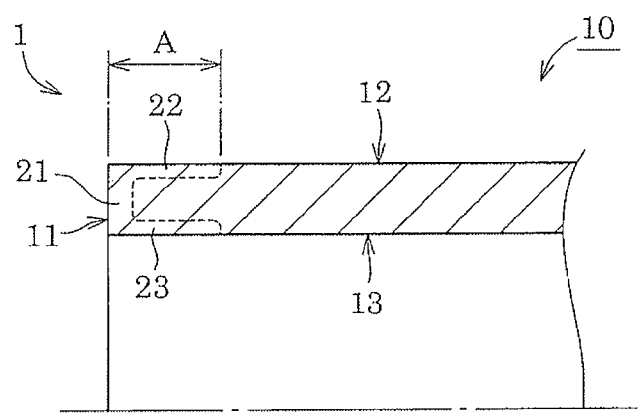
FIG. 2 is an enlarged schematic vertical section view of a reed switch glass tube in an embodiment of the present invention.

As shown in FIG. 1, a reed switch glass tube 10 of the present invention is in the form of a cylinder with an outer diameter of 1.75 mm, a thickness of 0.25 mm, and a length of 7.7 mm, in which a compression stress layer 2 is formed on each surface of both end parts 1 thereof. That is, as shown in FIG. 2, in each end part 1 of the reed switch glass tube 10, a compressive stress layer 21 is formed on an end face 11 of the glass tube from a surface thereof to a necessary depth, a compressive stress layer 22 is formed on an outer circumference surface 12 from a surface thereof to a necessary depth, and a compressive layer 23 is formed on an inner circumference surface 13 of the glass tube from a surface thereof to a necessary depth. Such compressive stress layers (21, 22, 23) are consecutive.

Further, a length A in a longitudinal direction of the glass tube in the compressive stress layer 22 formed on the outer circumference surface 12 is set at about 0.4 mm. The Length A of the compressive stress layer 22 is preferably 0.1 mm to 0.6 mm. When the length A is smaller than 0.1 mm, it is impossible to effectively prevent, for example, chipping of end parts of the glass tube 10 caused by contact with the outside or the like. On the other hand, when the length A is greater than 0.6 mm, tensile stress which acts around the compressive stress layer 22 becomes greater as reaction of compressive stress in the compressive stress layer 22. As a result, this easily causes destruction of the glass tube 10, which is not preferable.

Figure 4:
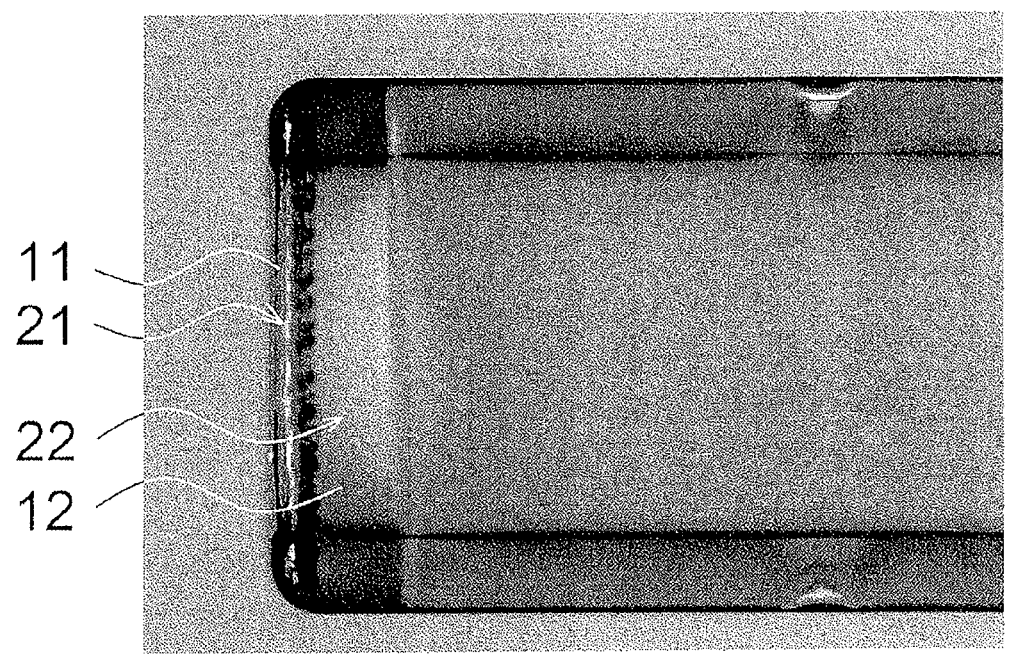
FIG. 4 is a polarizing microscope photograph of an end part of a reed switch glass tube in an embodiment of the present invention.

Furthermore, the reed switch glass tube 10 of the present invention is so formed that stress in the compressive stress layer 21 formed on the end face 11 is greater than stress in the compressive stress layer 22 formed on the outer circumference surface 12. This makes it possible to effectively prevent chipping of particularly the end face 11 out of the end parts 1 of the reed switch glass tube 10. FIG. 4 is a polarizing microscope photo of end parts of the reed switch glass tube 10 of the present invention. As displayed in the whitest in a image in FIG. 4, stress in the compressive stress layer 21 formed on the end face 11 is greater than stress in the compressive stress layer 22 formed on the outer circumference surface 12.

Figure 5:
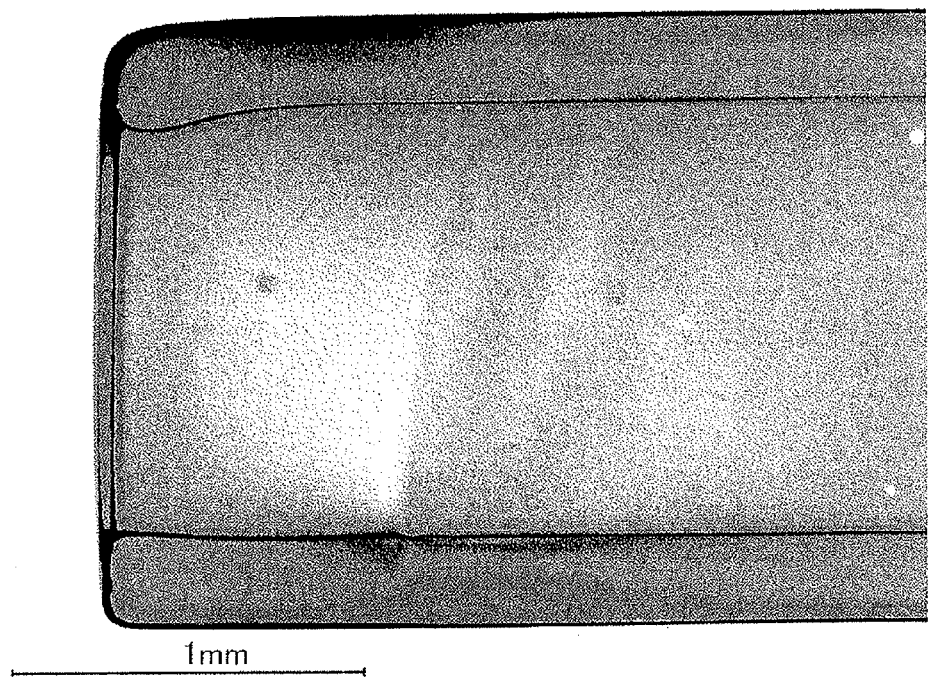
FIG. 5 is a polarizing microscope photograph of an end part of a conventional reed switch glass tube.

FIG. 5 is a polarizing microscope photo of end parts of a glazing treated-glass tube by conventional burner heating. It is also possible to form a compressive stress layer at an end part of a glass tube using glazing treatment by conventional burner heating. However, as shown in FIG. 5, the compressive stress layer formed by burner heating is not great enough to prevent, for example, chipping caused by contact with the outside or the like and in addition, the formation range of the compressive stress layer would reach a wide range (a length of about 1.2 mm or greater from the end face).

Moreover, the reed switch glass tube 10 of the present invention is formed of high-infrared absorption glass whose infrared transmittance at a wavelength of 1,050 nm is 10% or lower for a thickness of glass of the glass tube of 0.5 mm. This makes it possible to effectively absorb infrared rays of a halogen lamp at the time of encapsulation process of the reed switch. As a result, even when the glass tube is a minute glass tube, it is possible to securely seal both end parts thereof. When the glass tube has an infrared transmittance at a wavelength of 1,050 nm of over 10% for a thickness of the glass of 0.5 mm, infrared absorption from the halogen lamp becomes insufficient. As a result, not only extra time and energy are needed for the encapsulation process but also the amount of infrared rays that reaches inside the reed switch after transmitting the glass and a contact point portion of the reed switch is heated, resulting in arising of a problem of deterioration of magnetic property thereof.

As high-infrared absorption glass with an infrared transmittance at a wavelength of 1,050 nm of 10% or lower for a thickness of the glass of 0.5 mm, infrared absorption glass with a composition of 60% to 75% of $SiO_2$, 1% to 10% of $Al_2O_3$, 0% to 10% of $B_2O_3$, 3.5% to 10% of RO (R is one or more kinds selected from Ca, Mg, Ba, Sr or Zn), 0.5% to 5% of $Li_2O$, 8% to 17% of $Na_2O+K_2O$, 2% to 10% of $Fe_3O_4$ in a weight percentage is preferably used.

While $SiO_2$ is a major component necessary to constitute a glass skeleton, solubility is deteriorated as well as lowering of a linear thermal expansion coefficient when the content of $SiO_2$ is more than 75% and chemical durability is deteriorated when the content of $Sio_2$ is less than 60%. Accordingly, glass is transformed by chemical treatment such as electroplating in a reed switch manufacturing process. This makes it impossible to obtain weather resistance to maintain long-term reliability as electronic parts.

Although $Al_2O_3$ has remarkable effects for improving weather resistance of glass and controlling devitrification in glass dissolution, when the content of $Al_2O_3$ is more than 10%, dissolution of glass is difficult. When the content of $Al_2O_3$ is less than 1%, it is impossible to obtain the aforementioned effects.

$B_2O_3$ has the effect of increasing an efficiency of encapsulation by decreasing viscosity of glass along with promoting the dissolution of glass. However, when the content of $B_2O_3$ is more than 10%, chemical durability is deteriorated and it is impossible to obtain homogeneous glass due to an increase in evaporation at the time of dissolution.

CaO, MgO, BaO, SrO, and ZnO represented by RO have an improving effect on weather durability of glass as well as decreasing viscosity of glass. However, when the total content of RO is more than 10%, devitrification of glass is increased, resulting in difficulty in manufacturing homogeneous glass. When the content of RO is less than 3.5%, it is impossible to obtain the aforementioned effect.

$Li_2O$ has the effect of increasing a linear thermal expansion coefficient of the reed switch while keeping specific volume resistivity of glass which is needed as electric insulation of the reed switch high to some extent. Further, $Li_2O$ has a significantly profound effect as a flux and an effect of reducing viscosity, so that it is possible to minimize the content of $B_2O_3$ which is also a component that is easily evaporated while generally used as a flux of glass by using $Li_2O$ as an essential component. However, when the content of $B_2O_3$ contained in glass is more than 5%, weather resistance and devitrification of glass are deteriorated, which is not preferable. On the other hand, when glass has a content of $B_2O_3$ of less than 0.5%, it is impossible to obtain the aforementioned effect.

As is the case with $Li_2O$, as well as increasing the linear thermal expansion coefficient of glass, $Na_2O$ and $K_2O$ are components to promote melting glass. However, when a total content of $Na_2O$ and $K_2O$ is over 17%, as well as excessively increasing the linear thermal expansion coefficient, weather resistance and specific volume resistivity of glass are significantly deteriorated. On the other hand, when the total content of $Na_2O$ and $k_2O$ is less than 8%, it is impossible to obtain a predetermined linear thermal expansion coefficient, resulting in difficulty in melting of glass.

In the case where the content of one component out of $Li_2O$, $Na_2O$, and $K_2O$ is restricted within 80% of the total amount alone, it is possible to obtain more superior weather resistance and high specific volume resistivity by operation of a mixed alkali effect.

$Fe_3O_4$ (Although FeO absorbs infrared rays, FeO coexists with $Fe_2O_3$ depending on redox in glass. All ferric oxide is represented by the conversion into $Fe_3O_4$.) is used as an essential component for allowing glass to have infrared absorption capacity. However, in the case where the content of $Fe_2O_3$ is more than 10%, vitrification becomes difficult and in the case where the content of $Fe_2O_3$ is less than 2%, it is impossible to restrict the infrared transmittance at a wavelength of 1,050 nm to 10% or lower for a thickness of the glass of 0.5 mm.

In addition, in the aforementioned glass, it is possible to add each component up to 3%, such as $ZrO_2$ and $Tio_2$ or the like for the purpose of adjusting viscosity of glass and improving devitrification and weather resistance.

Next, a method for manufacturing a reed switch glass tube 10 of the present invention is described as below.

First, a batch having the aforementioned composition is prepared and is then dissolved. Thus obtained melt glass is formed in the form of a tube to obtain an infrared absorption glass tube 3 by cutting to a predetermined length.

Figure 3:
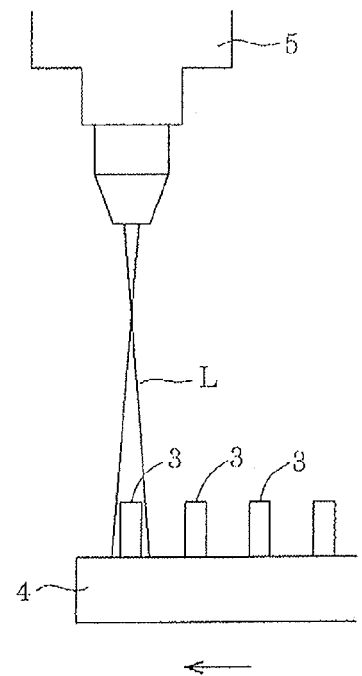
FIG. 3 is a diagrammatic side view illustrating a method for producing a reed switch glass tube in an embodiment of the present invention.

As shown in FIG. 3, a plurality of infrared absorption glass tubes 3 are fixed to a fixture 4 and an end face of each glass tube 3 is softened by heating by the irradiation of laser light L from an upward laser 5. This laser heating is performed by irradiating the end face of each glass tube 3 with the laser light L having a beam diameter which is greater than an outer diameter of the end face of each glass tube 3.

This makes it possible to uniformly soften by heating the entire end face of each glass tube 3. It is possible to reliably form a compressive stress layer at the end parts thereof, even in the case of a minute reed switch glass tube. Further, it is possible to effectively absorb the laser light L irradiated to the end face of the infrared absorption glass tube 3 and in addition to that, it is possible to effectively soften by heating only around the surface of the end face. As a result, it is possible to suitably form a compressive stress layer having a stress greater than that of the compressive stress layer of the outer circumference surface on the end face of the glass tube 3.

Furthermore, a compressive stress layer is formed on an end part of each glass tube 3 by cooling by blowing air or naturally cooling the end face of each glass tube 3 soften by heating. In such a manner, the reed switch glass tube 10 of the present invention is produced.

As mentioned above, in the reed switch glass tube 10 of the present invention, the compressive stress layer 22 having a length A within a range of 0.1 mm to 0.6 mm from the end face 11 is formed on the outer circumference surface 12 of the end part 1 thereof. Accordingly, it is possible to reliably prevent, for example, chipping and cracking of the end parts of the glass tube even when making contact with the outside typically during transport.

In addition, the reed switch glass 10 can reliably prevent particularly chipping and cracking of the end face 11 thereof because the compressive stress layer 21 with a stress greater than a stress in the compressive stress layer 22 formed on the outer circumference surface 12 is formed on the end face 11 thereof.

Since glass of the reed switch glass tube 10 of the present invention has an infrared transmittance at a wavelength of 1,050 nm of 10% or lower for a thickness of the glass of 0.5 mm, it becomes possible to effectively absorb infrared rays of a halogen lamp at the time of an encapsulation process of the reed switch. As a result, even in the case of a minute glass tube, it is possible to securely seal both end parts of the glass tube.

While the reed switch glass tube 10 of the present invention has thus been described so far, the present invention may be embodied in other forms.

In the aforementioned embodiments, while a minute reed switch glass tube with an outer diameter of 1.75 mm, a thickness of 0.25 mm, and a length of 7.7 mm has been described so far as one example of a reed switch glass tube, it is to be understood that the present invention is not limited to this size and typically, a reed switch glass tube with an outer diameter of 4.95 mm, a thickness of 0.65 mm, and a length of 18.4 mm may be used.

It is to be understood that the present invention may be embodied in several forms in which any and all improvements, modifications, and variations may be added based on the knowledge of those skilled in the art without departing from the spirit of the present invention. And the present invention may be embodied in the forms in which any matters to define the invention are replaced by other art within the scope in which identical operation or effects are created. In addition, the invention may be embodied in the forms in which matters to define the invention integrally formed are composed of a plurality of members or matters to define the invention composed of a plurality of members are integrally formed.

What is claimed is:

1. A reed switch glass tube comprising:
   opposite end parts, each having a respective compressive stress layer formed on an outer circumference surface of the glass tube, the compressive stress layer having a length of 0.1 mm to 0.6 mm in a longitudinal direction; and
   a portion without any compressive stress layer existing between the respective compressive stress layers at the opposite end parts.

2. The reed switch glass tube according to claim 1, wherein
   stress in each of the respective compressive stress layers formed on a respective end face of the glass tube in each of the end parts is greater than stress in the compressive stress layer formed on the outer circumference surface of each of the end parts.

3. The reed switch glass tube according to claim 1, wherein
   an infrared transmittance of glass of the reed switch glass tube at a wavelength of 1,050 nm is 10% or lower for a thickness of the glass of 0.5 mm.

4. The reed switch glass tube according to claim 2, wherein
   an infrared transmittance of glass of the reed switch glass tube at a wavelength of 1,050 nm is 10% or lower for a thickness of the glass of 0.5 mm.

5. The reed switch glass tube according to claim 1, wherein
   each of the compressive stress layers begins at a respective end face of the reed switch glass tube and extends 0.1 mm to 0.6 mm inward from its respective end face of the reed switch glass tube.

6. The reed switch glass tube according to claim 1, wherein
   each of the compressive stress layers extends 0.1 mm to 0.6 mm inward from a respective end face of its respective end part of the reed switch glass tube.

7. A reed switch glass tube comprising:
   a compressive stress layer formed at an end part of the glass tube, the compressive stress layer including
     a first portion formed on an outer circumference surface of the end part of the glass tube and having a length of 0.1 mm to 0.6 mm in a longitudinal direction, and
     a second portion formed on an end face of the end part of the glass tube, with stress in the first portion being different from stress in the second portion.

8. The reed switch glass tube according to claim 7, wherein
   the stress in the compressive stress layer formed on the end face of the glass tube in the second portion is greater than the stress in the compressive stress layer formed on the outer circumference surface in the first portion.

9. The reed switch glass tube according to claim 7, wherein
   an infrared transmittance of glass of the reed switch glass tube at a wavelength of 1,050 nm is 10% or lower for a thickness of the glass of 0.5 mm.

10. The reed switch glass tube according to claim 8, wherein
    an infrared transmittance of glass of the reed switch glass tube at a wavelength of 1,050 nm is 10% or lower for a thickness of the glass of 0.5 mm.

11. The reed switch glass tube according to claim 7, wherein
    the compressive stress layer of the first portion begins at an end face of the reed switch glass tube and extends 0.1 mm to 0.6 mm inward from the end face of the reed switch glass tube.

12. The reed switch glass tube according to claim 7, wherein
  the reed switch glass tube has opposite end parts, each having a respective compressive stress layer; and
  each compressive stress layer extends 0.1 mm to 0.6 mm inward from a respective end face of its respective end part of the reed switch glass tube.

13. A method for glazing a reed switch glass tube, the method comprising:
  irradiating laser light to an end face of the glass tube to soften by heating end parts of the glass tube; and
  forming a respective compressive stress layer on an outer circumference surface of the glass tube in each of the end parts, such that the glass tube has a portion without any compressive stress layer existing between the two compressive stress layers at the end parts, and each of the respective compressive stress layers has a length of 0.1 mm to 0.6 mm in a longitudinal direction.

14. The method according to claim 13, wherein
  a beam diameter of the laser light is greater than an outer diameter of the end face of the glass tube.

\* \* \* \* \*